(12) United States Patent
Pendlebury

(10) Patent No.: US 9,150,157 B1
(45) Date of Patent: Oct. 6, 2015

(54) CONVERTIBLE VANITY MIRROR ASSEMBLY

(71) Applicant: Ford Global Technologies, LLC, Dearborn, MI (US)

(72) Inventor: Jon Robert Pendlebury, Torquay (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/251,790

(22) Filed: Apr. 14, 2014

(51) Int. Cl.
*B60R 1/12* (2006.01)
*B60J 3/02* (2006.01)
*B60R 1/00* (2006.01)

(52) U.S. Cl.
CPC ............... *B60R 1/12* (2013.01); *B60J 3/0282* (2013.01); *B60R 1/008* (2013.01); *B60R 2001/1269* (2013.01)

(58) Field of Classification Search
CPC ........... B60J 3/0282; B60R 1/12; B60R 1/008
USPC ........ 296/97.5, 97.1, 97.2; 859/844, 846, 847
See application file for complete search history.

(56) References Cited

U.S. PATENT DOCUMENTS

| | | | |
|---|---|---|---|
| 4,895,435 A * | 1/1990 | Shomper | ...................... 359/844 |
| 7,188,964 B2 | 3/2007 | Ealey | |
| 7,192,145 B2 | 3/2007 | Ealey | |
| 7,311,408 B2 * | 12/2007 | Lee et al. | ...................... 359/846 |
| 7,686,464 B2 | 3/2010 | Compton et al. | |
| 8,425,094 B2 | 4/2013 | Stakoe et al. | |
| 8,434,812 B2 | 5/2013 | Li et al. | |
| 2002/0159168 A1 | 10/2002 | Epps et al. | |
| 2012/0275040 A1 | 11/2012 | Li et al. | |
| 2013/0225026 A1 | 8/2013 | Langhorst | |

FOREIGN PATENT DOCUMENTS

| | | |
|---|---|---|
| CN | 202966144 U | 6/2013 |
| WO | 2012121499 A2 | 9/2012 |

* cited by examiner

*Primary Examiner* — Joseph D Pape
(74) *Attorney, Agent, or Firm* — Vichit Chea; Price Heneveld LLP

(57) ABSTRACT

In a convertible mirror assembly for a vehicle visor, a flexible mirror is operably coupled to a housing and is operable between first and second display states. A slider mechanism is slidably supported on the housing and operably coupled to the flexible mirror. The slider mechanism is adapted to move along the housing between retracted and extended positions, whereby the flexible mirror is in the first display state when the slider mechanism is in the retracted position, and in the second display state when the slider mechanism is in the extended position. When moved to the extended position, the slider mechanism urges the flexible mirror to an outwardly curved or convex configuration to define a conversation mirror configuration.

18 Claims, 3 Drawing Sheets

CONVERTIBLE VANITY MIRROR ASSEMBLY

FIELD OF THE INVENTION

The present invention generally relates to vanity mirror disposed on an automotive sun visor in a vehicle interior, and more particularly, to a convertible mirror assembly that is operable between generally planar and curved configurations.

BACKGROUND OF THE INVENTION

Automotive vehicles are commonly equipped with a pair of sun visors generally connected to the roof or headliner forward of the driver and front passenger seats. Each visor is typically connected via a pivot mechanism and may be actuatable between stowed and deployed positions to provide shade from sunlight. The conventional visor typically includes a flat and rigid mirror disposed in a vanity mirror assembly. The vanity mirror assembly is generally installed on a selected side of the visor body. Generally, the vanity mirror assembly includes a planar mirror and one or more vanity lights and lenses to provide lighting sufficient to enable a user to view a reflected image in the mirror. Some vehicles have also employed conversation mirrors typically mounted on the overhead console in an attempt to provide a means of viewing passengers seated in rear occupant positions for conversation and monitoring activities in rear seats. Conversation mirrors are generally curved mirrors that can be bulky for storing purposes The present invention provides a mirror assembly that is operable between substantially planar and curved configurations to provide a both a standard mirror and a conversation mirror in one convertible mirror assembly.

SUMMARY OF THE INVENTION

One aspect of the present invention includes a convertible mirror assembly for a vehicle visor having a housing with a flexible mirror operably coupled to the housing. A slider mechanism is operably coupled to both the housing and the flexible mirror. The slider mechanism is configured to move the flexible mirror between first and second display states. The flexible mirror is substantially planar in the first display state. Further, the flexible mirror is outwardly curved from the vehicle visor in the second display state.

Another aspect of the present invention includes a convertible mirror assembly for a vehicle visor having a visor body with first and second surfaces. A housing is disposed on the second surface and includes a flexible mirror disposed therein. A slider mechanism is slidably supported along a portion of the housing and is configured to move the flexible mirror between first and second display states within the housing. The flexible mirror is curved outwardly from the housing and the second surface of the visor body when the flexible mirror is in the second display state.

Yet another aspect of the present invention includes a convertible mirror assembly for a vehicle visor having a housing which includes upper and lower track members. A flexible mirror is disposed between the upper and lower track members of the housing. A slider mechanism is slidably supported on the upper and lower track members and is configured to move the flexible mirror between first and second display states within the housing. The flexible mirror defines a conversation mirror when the flexible mirror is in the second display state.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
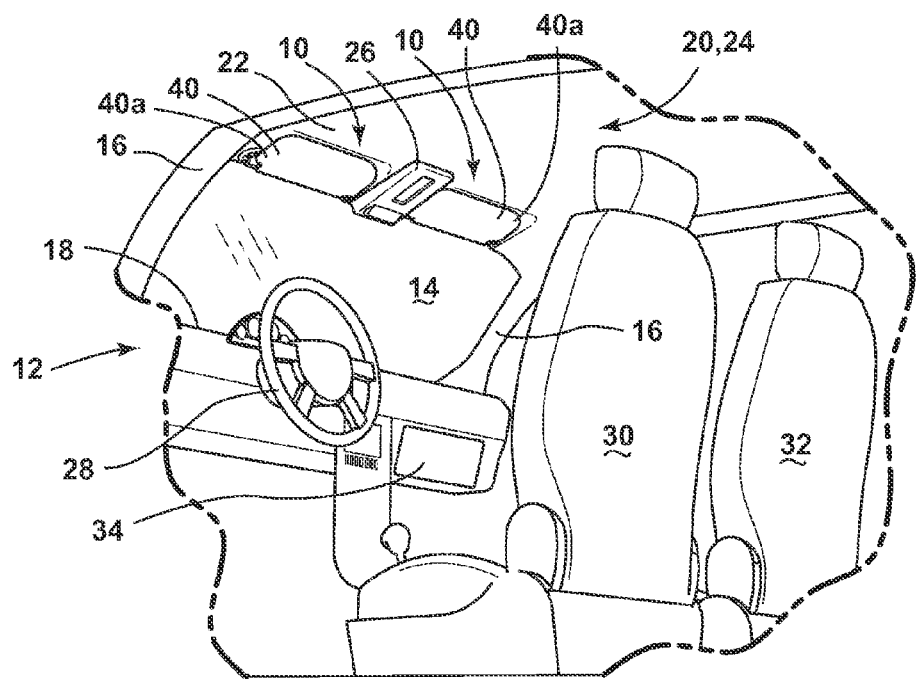
FIG. 1 is a bottom perspective view of a passenger compartment of a vehicle.

For purposes of description herein, the terms "upper," "lower," "right," "left," "rear," "front," "vertical," "horizontal," and derivatives thereof shall relate to the visor and lighting assembly as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle 12 is shown which includes a front windshield 14 defined between left and right A-pillars 16 extending from a generally horizontal dash member 18 to a roof 20 of the vehicle 12. An upper portion of the windshield 14 is bordered by a header 22 that extends between the A-pillars 16. A headliner 24 is disposed over and defines an interior trim surface of the header 22. In the illustrated embodiment, the headliner 24 also extends rearward concealing the roof 20 of the vehicle 12 to further define the interior trim surface of the vehicle 12. In the embodiment of FIG. 1, an accessory compartment 26 is centrally disposed on the header 22 between the left and right A-pillars 16 and extends rearward on the interior surface of the headliner 24. It is contemplated that the accessory compartment 26 may be elongated, alternatively shaped, or otherwise not included on the header 22.

As further shown in FIG. 1, a pair of visor assemblies 10 are pivotally coupled to the header 22 and positioned on opposing sides of the accessory compartment 26. More specifically, the visor assemblies 10 are attached to a forward portion of the roof 20 proximate an upper portion of the windshield 14, which includes the header 22 covered with the headliner 24. Accordingly, one of the visor assemblies 10 is disposed on a driver's side of the vehicle 12 defined by the region having a steering wheel 28 and a driver's side seat 30. The other visor assembly 10 is disposed on a passenger side of the vehicle 12 having a passenger side seat 32 and a glove compartment 34. Each visor assembly 10 includes a shade panel or visor body 40 that defines a main body portion of each visor assembly 10. It is contemplated that more than two visor assemblies 10 may be included in the vehicle 12, and further, the visor assemblies 10 may be alternatively oriented on the header 22 or other interior surfaces of the vehicle 12. For purposes of the present disclosure, the visor assembly 10 on the passenger side of the vehicle 12 will be described with the understanding that the opposing driver side visor assembly 10, may include similar components.

Figure 2:
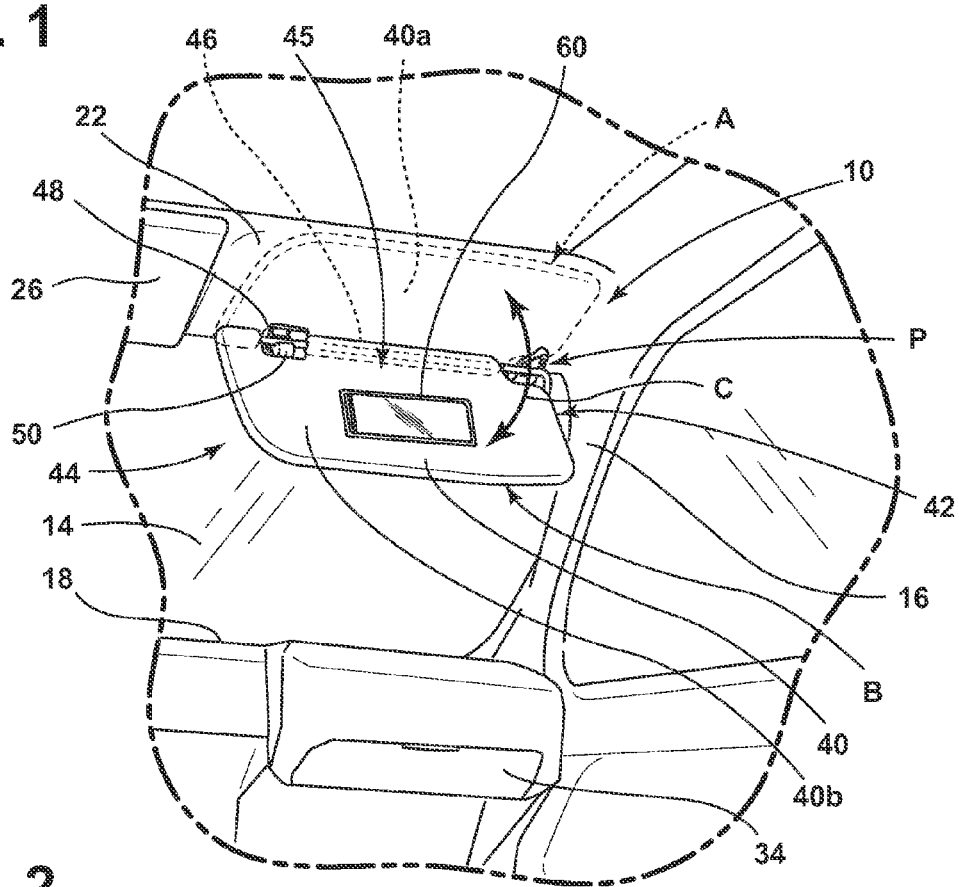
FIG. 2 is a bottom perspective view of a passenger side portion of the passenger compartment of FIG. 1.

Referring now to FIG. 2, the visor body 40 has a first end 42 and a second end 44 with an intermediate portion 45 disposed therebetween. A support member 46 extends through an edge of the intermediate portion 45 of the visor body 40 and includes an exposed portion 48 that is releasably coupled to a clip member 50 disposed in the header 22. Thus, the second end 44 of the visor body 40 is retained by the clip member 50 at the exposed portion 48 of the support member. At the first end 42 of visor body 40, a pivot point P is shown, wherein the support member 46 is pivotally coupled with an outboard region of the header 22 proximate the A-pillar 16 on the corresponding side of the vehicle 12. The pivot point P typically includes a frictional pivot joint attached to the header 22, which allows the visor body 40 to maintain a fixed position upon movement about the pivot point P. However, it is contemplated that the frictional pivot joint may be otherwise replaced with an alternative connection or be otherwise omitted. In the illustrated embodiment, the visor body 40 is rotatable about the support member 46 between a stowed position A, shown in phantom, to a deployed position B along a path indicated by arrow C. This rotational movement allows an occupant to adjust the angle of the visor body 40 and also provides access to first and second surfaces 40a, 40b of the visor body 40 as further described below. The visor body 40 may be positioned at any intermediate position between the stowed and deployed positions A, B, as well as other positions not illustrated. It is also contemplated that the visor body 40 may be alternatively pivoted to the deployed position B about the pivot point P of the visor body 40 in conjunction with the frictional pivot joint, opposed to rotating about the support member 46. The clip member 50 is coupled with an inboard region of the header 22 proximate the central region of the headliner 24 and the accessory compartment 26. The clip member 50 is configured to retain the second end 44 of the visor body 40 to the headliner 24, permitting the visor body 40 to rotate between the stowed and deployed positions A, B.

As noted above, the visor body 40 includes first and second surfaces 40a, 40b. The first surface 40a is exposed when the visor body 40 is in the stowed position A, as shown in FIG. 1. The second surface 40b is exposed when the visor body 40 is in the deployed position B, as shown in FIG. 2. As further shown in FIG. 2, the visor body 40 includes a convertible mirror assembly 60 disposed on the second surface 40b. In the embodiment of FIG. 2, the convertible mirror assembly 60 is generally centrally disposed on the visor body 40 at the intermediate portion 45, but may also be disposed near either the first or second ends 42, 44 of the visor body 40. The convertible mirror assembly 60 is convertible having first and second display states as further described below.

Figure 3:
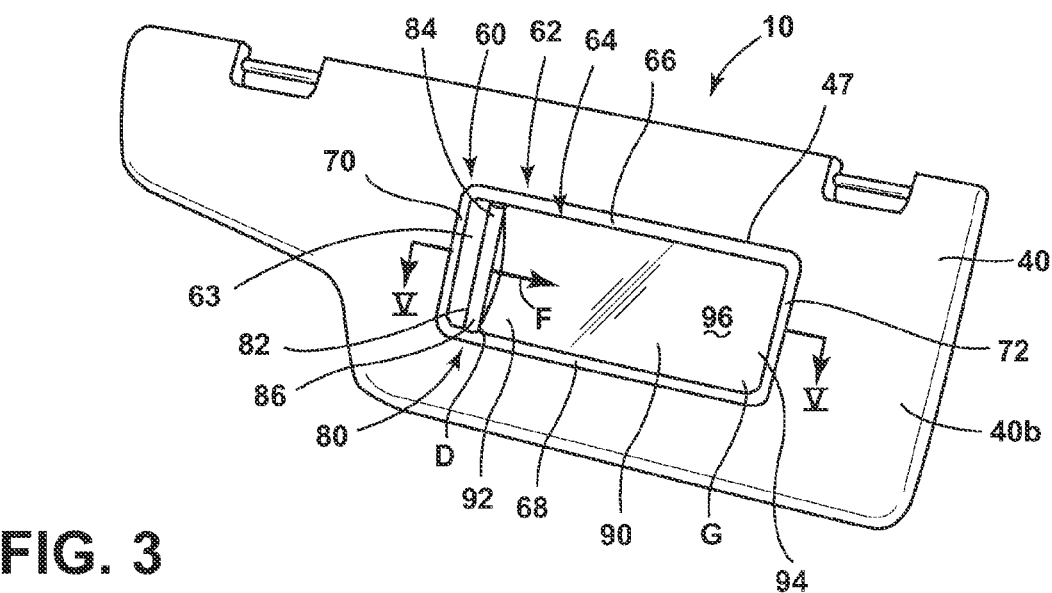
FIG. 3 is a top perspective view of a visor assembly having a convertible mirror assembly in a first display state.

The convertible mirror assembly 60 may include a cover or lid. The lid may be a pivoting lid or a sliding lid that substantially covers the convertible mirror assembly 60 when in a closed position over the convertible mirror assembly 60. The visor body 40 may be comprised of a polymeric material that provides for a polypropylene clamshell made up of structural outer surfaces, such as surfaces 40a and 40b, having a cavity or hollow core disposed therebetween. The outer surfaces 40a, 40b can be covered with a fabric material for aesthetic and comfort purposes. The fabric covering may include a polyester fiber, according to one embodiment. The visor body 40 may also include a mounting aperture 47 for receiving the convertible mirror assembly 60. In the embodiment of FIG. 3, mounting aperture 47 is disposed on the second surface 40b and opens into the hollow core of the visor body 40. Mounting aperture 47 may be integrally molded in the substrate of the visor body 40, or may be otherwise formed such as by cutting or otherwise removing substrate material. It is further contemplated that the visor body 40 may include one or more lights for providing vanity lighting.

Figure 4:
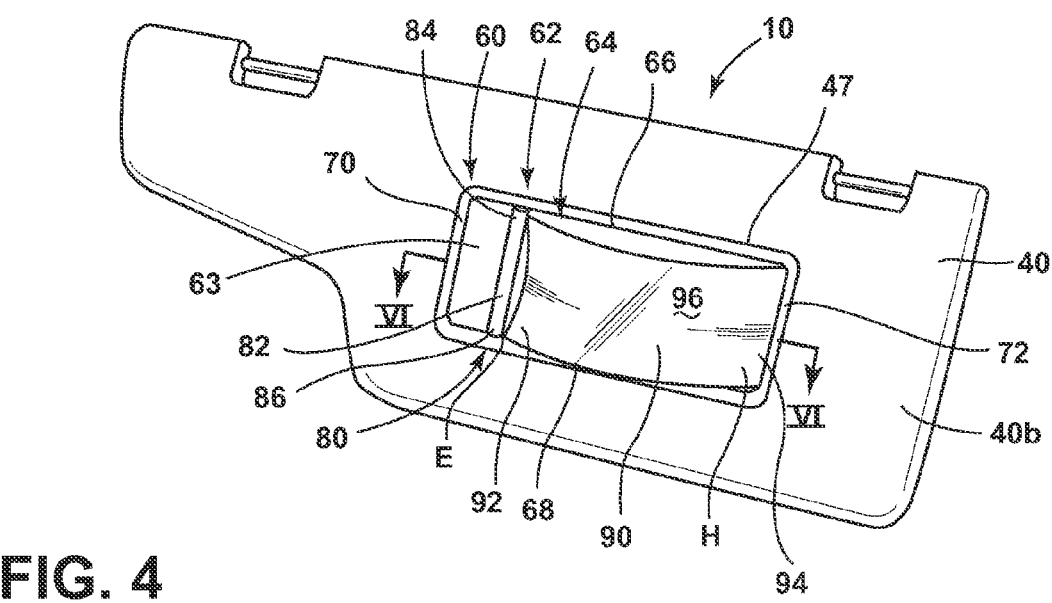
FIG. 4 is a top perspective view of the visor assembly of FIG. 3 showing the convertible mirror assembly in a second display state.

Referring now to FIGS. 3 and 4, the convertible mirror assembly 60 is shown generally having a housing 62 received within the mounting aperture 47 in visor body 40. The housing 62 defines a frame or bezel that may either fully or partially surround the mounting aperture 47 in visor body 40. The housing 62 may be a polymeric housing that is covered by a fabric, or may be visible on the second surface 40b as shown in FIG. 3. The housing 62 includes a track system 64 made up of upper and lower track members 66, 68. The upper and lower track members 66, 68 are generally parallel members which are spaced apart to define upper and lower portions of the housing 62. The housing 62 further includes first and second side members 70, 72 which are disposed at opposite ends of the upper and lower track members 66, 68 to define a surround frame or bezel. In assembly, the upper and lower track members 66, 68 slidably support a slider mechanism 80 which is adapted to slide along a length of the housing 62. The slider mechanism 80 includes a handle portion 82 having upper and lower ends 84, 86 which couple to the upper and lower track members 66, 68 respectively. It is contemplated that the slider mechanism 80 works in conjunction with the upper and lower track members 66, 68 of the housing 62 in a manner similar to a sliding cover or lid for a vanity mirror known in conventional mirror assemblies. As shown in FIG. 3, the handle 82 of the slider mechanism 80 is a rounded member that protrudes outwardly from the housing 62, such that the handle 82 is easily engaged by a user for sliding along a length of the housing 62. In FIG. 3, the slider mechanism 80 is in a first position D adjacent the first side member 70 of the housing 62. The first position D is considered a retracted position for slider mechanism 80. From the retracted first position D, the slider mechanism can move or extend to a second position E, as shown in FIG. 4, along a path as indicated by arrow F. In the second position E, the handle 82 of the slider mechanism 80 has moved towards side member 72 of the housing 62 to an extended position. The slider mechanism 80 is retained in the housing 62 by the upper and lower track members 66, 68, between retracted and extended positions D, E.

As further shown in FIGS. 3 and 4, a flexible mirror 90 is coupled to the handle 82 of the slider mechanism 80 at a first end 92, and further coupled to second side member 72 of the housing 62 at an opposite and second end 94. The flexible mirror 90 includes a body portion 96 which is flexible, thereby allowing the flexible mirror 90 to move between a generally planar configuration G, as shown in FIG. 3, to a curved or convex configuration H, as shown in FIG. 4. In the generally planar configuration G, as shown in FIG. 3, the flexible mirror 90 is substantially flat and defines a vanity mirror that can be used by a vehicle occupant to view a reflected image. The viewing range of the vanity mirror is generally limited and most often used by a vehicle occupant to view their own reflected image in a close-up manner. In the curved or convex configuration H, as shown in FIG. 4, the flexible mirror 90 is curved outwardly from the housing 62 and visor body 40 to define a conversation mirror that can be used by a vehicle occupant to view a reflected image. The term "conversation mirror," as used herein, is defined as a mirror that provides a wide viewing angle to enable a viewer to view a larger area as compared to a flat vanity mirror. The conversation mirror is shown and described herein as a mirror with a convex surface to allow the view of a wide angle image, in contrast to a flat or planar mirror typically used in a visor vanity pack. In the conversation mirror configuration H, the flexible mirror 90 has a curvature, such as a convex shape, that offers wide angle viewing to enable a viewer, such as passenger seated in passenger seat 32, to view objects within a wide field of view, including other passengers seated rearward in the vehicle 12, such as for conversation purposes and for monitoring children's activities to name a couple of examples. According to the embodiment of FIG. 4, the flexible mirror 90 has a spherical shape portion when in the conversation configuration H. In this way, the flexible mirror 90 of the present invention provides for first and second display states G, H within one convertible mirror assembly 60.

Figure 5:
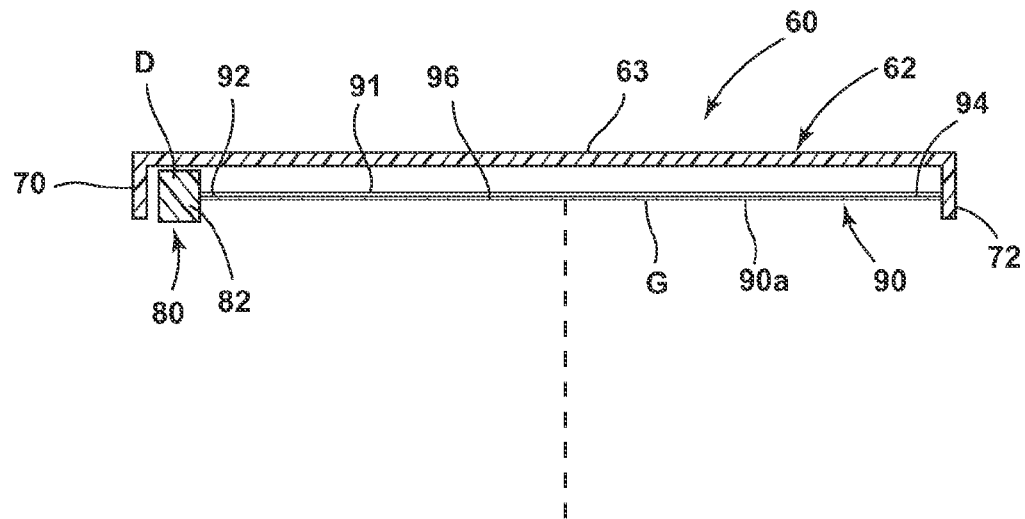
FIG. 5 is a cross-sectional view of the mirror assembly of FIG. 3 taken along line V.
Figure 6:
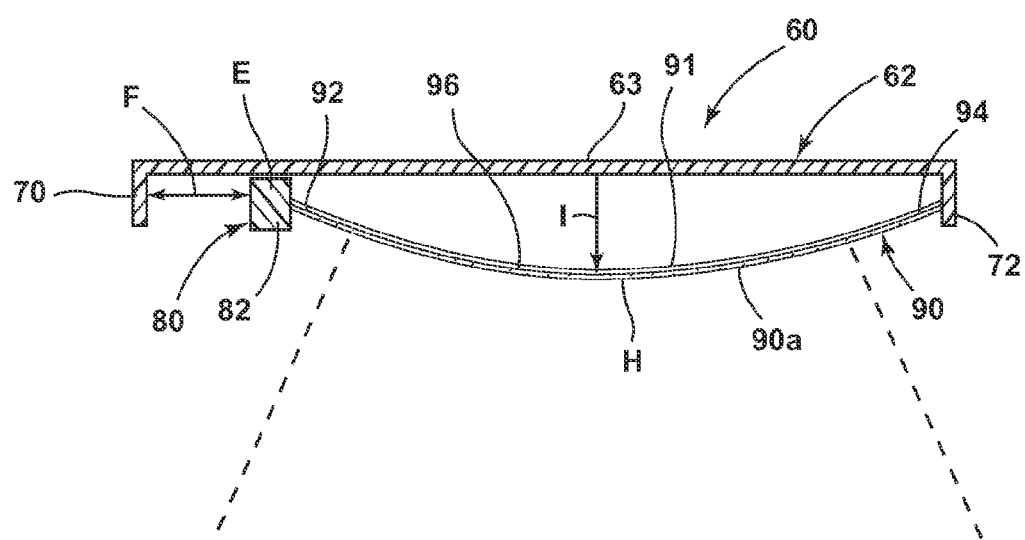
FIG. 6 is a cross-sectional view of the mirror assembly of FIG. 4 taken along line VI.

Being substantially planar, first display state G of the flexible mirror 90 is low-profile and allows for easy stowing of the visor body 40 to the stowed position A, as shown in FIG. 1. When the flexible mirror 90 is in the second display state H, the body portion 96 of the flexible mirror 90 is curved outwardly from the housing 62. Referring now to FIGS. 5 and 6, the convertible mirror assembly 60 is shown in first and second display states G, H, respectively. With specific reference to FIG. 5, the slider mechanism 80 shows the handle member 82 in the retracted position D, such that the flexible mirror 90, as coupled thereto, is in the generally planar first display state G. As noted above, the first display state G defines a standard vanity mirror configuration having a straight viewing angle for viewing reflected images as generally indicated by the dashed lines of FIG. 5. In the embodiment shown in FIGS. 5 and 6, the housing 62 includes a backing member 63 which is disposed between first and second side members 70, 72. With specific reference to FIG. 6, the slider mechanism 80 has been moved such that the handle member 82 is in the extended position E. Thus, the handle member 82 has moved from the retracted position D to the extended position E along a path as indicated by arrow F. It is contemplated that movement from the retracted position D to the extended position E may only need to be about 5 millimeters (mm) along the housing 62 in order to provide for a curved mirror configuration H for the flexible mirror 90. Thus, as the slider mechanism 80 moves to the extended position E, the flexible mirror 90 bows or curves outwardly along a path as indicated by arrow I from the housing 62. The convex or curved configuration of the second display state H provides for a wide viewing angle as indicated by the dashed lines in FIG. 6. Thus, as coupled thereto, the flexible mirror 90 is urged outwardly to a curved or convex position H when the slider mechanism 80 is moved to the extended position E. The curved or convex configuration H is realized as the slider mechanism 80 acts on the flexible mirror 90 which is abuttingly coupled to second side member 72 of the housing 62. This abutting relationship between the flexible mirror 90 and the second side member 72 and slider mechanism 80 creates the convex configuration H of the flexible mirror 90 as the slider mechanism 80 moves inwardly in a direction as indicated by arrow F.

The flexible mirror 90 is generally comprised of an acrylic plastic outer surface 90a, wherein the acrylic plastic outer surface 90a is a flexible member having a reflective or mirrored surface. The outer surface 90a of the flexible mirror 90 is lightweight and generally break resistant. This outer surface 90a is generally applied to a backing layer 91 as shown in FIGS. 5 and 6. The coupling of the outer surface 90a and the backing layer 91 may be done with a suitable adhesive. The backing layer 91 may be comprised of a relatively thin acrylic sheet having a thickness of about 0.5 mm to about 3 mm, or a polyester film substrate, such as Mylar, having a thickness of about 1.0 mm to about 1.5 mm. The thickness of the backing layer 91 can vary per application, and is demonstrated above for exemplary purposes only. The backing layer 91 provides support for the flexible mirror 90, such that the conversion of the flexible mirror 90 between the first and second display states G, H is controlled and steady.

According to one example, the convertible mirror assembly 60 has a viewing window size of approximately fifty millimeters (50 mm) by thirty millimeters (30 mm). However, it should be appreciated that the size, shape and location of the convertible mirror assembly 60 on the visor body 40 may otherwise be configured, according to further embodiments. When use of the convertible mirror assembly 60 is no longer desired, a user may simply move the slider mechanism 80 to the retracted position D and stow the visor assembly 10. Thus, the present invention combines the function of both a flat vanity mirror and a convex conversation mirror in a cassette type housing 62 which can be fitted in the rearward side of a deployed sun visor assembly 10. The flexible mirror 90 defines a flexible mirrored surface that in one display state is flat (vanity mirror), display state G, and in another display state convex (conversation mirror), display state H. The housing 62 is shown herein having a rectangular shape, although the housing 62 is not limited to such a rectangular configuration. It is contemplated that the convertible mirror assembly 60 could be mounted in different supporting substrates, such as a headliner or the back of a front seat headrest, or any other location within a vehicle interior where a convertible mirror assembly is desired. The present invention may also be installed in any number of vehicles, such as boats, buses, planes, or other passenger vehicles. The upper and lower track members 66, 68 may include locating features, such that the slider mechanism 80 is securely located in either the extended or deployed positions E, D and tactile feedback may be provided by the locating features to the user as the slider mechanism snaps into place. The slider mechanism 80 can be frictionally continuous, thereby enabling variable curvatures and viewing angles for use with different interior cabin lengths with many rows of seats and occupants. Further, it is contemplated that the track system 64 may include a switch element that is configured to control vanity lighting disposed on the visor assembly 10. Further, it is contemplated that the track system 64 and the slider mechanism 80 may include a stop feature, such that the handle 82 of the slider mechanism 80 will abut the stop feature, such that the handle 82 does not move beyond the fully extended position E to a position that could potentially damage the flexible mirror 90.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A convertible mirror assembly for a vehicle visor, comprising:
   a housing;
   a flexible mirror operably coupled to the housing;
   a track system disposed on the housing, wherein the track system includes upper and lower track members; and
   a slider mechanism operably coupled to the housing along the track system and the flexible mirror, wherein the slider mechanism is configured to move the flexible mirror between first and second display states, wherein the flexible mirror is substantially planar in the first display state, and further wherein the flexible mirror is outwardly curved in the second display state.

2. The convertible mirror assembly of claim 1, wherein the slider mechanism includes a handle member having upper and lower ends, the upper end slidably coupled to the upper track member and the lower end slidably coupled the lower track member.

3. The convertible mirror assembly of claim 2, wherein the handle member is operable between retracted and extended positions along the track system, and further wherein the flexible mirror is urged towards the second display state when the handle member is moved to the extended position.

4. The convertible mirror assembly of claim 1, wherein the flexible mirror defines a vanity mirror in the first display state and further defines a conversation mirror in the second display state.

5. The convertible mirror assembly of claim 1, further comprising:
   a visor body having a mounting aperture disposed thereon, wherein the housing is received in the mounting aperture.

6. The convertible mirror assembly of claim 5, wherein the visor body is operable between stowed and deployed positions.

7. The convertible mirror assembly of claim 1, wherein the flexible mirror includes an outer reflective surface layer and a backing layer.

8. A convertible mirror assembly for a vehicle visor, comprising:
   a visor body having first and second surfaces;
   a housing disposed on the second surface, having a track system with upper and lower track members;
   a flexible mirror disposed within the housing; and
   a slider mechanism slidably supported along the track system of the housing and configured to move the flexible mirror between first and second display states within the housing, wherein the flexible mirror is curved outwardly from the housing in the second display state.

9. The convertible mirror assembly of claim 8, further comprising:
   a mounting aperture disposed on the second surface, wherein the housing is received in the mounting aperture.

10. The convertible mirror assembly of claim 9, wherein the flexible mirror includes an outer reflective surface layer and a backing layer.

11. The convertible mirror assembly of claim 8, wherein the flexible mirror defines a conversation mirror when the flexible mirror is in the second display state.

12. The convertible mirror assembly of claim 8, wherein the slider mechanism is operable between retracted and extended positions along the housing track system, and further wherein the flexible mirror is urged towards the second display state when the slider mechanism is moved to the extended position.

13. A convertible mirror assembly for a vehicle visor, comprising:
   a housing having upper and lower track members;
   a flexible mirror disposed between the upper and lower track members; and
   a slider mechanism slidably supported on the upper and lower track members and configured to move the flexible mirror between first and second display states within the housing, wherein the flexible mirror defines a conversation mirror in the second display state.

14. The convertible mirror assembly of claim 13, wherein the slider mechanism includes a handle member having upper and lower ends, the upper end slidably supported on the upper track member and the lower end slidably supported on the lower track member.

15. The convertible mirror assembly of claim 14, wherein the handle member is operable between retracted and extended positions along the housing, and further wherein the flexible mirror is urged towards the second display state when the handle member is moved to the extended position.

16. The convertible mirror assembly of claim 13, wherein the flexible mirror includes an acrylic outer reflective surface layer and a polymeric backing layer.

17. The convertible mirror assembly of claim 13, wherein the flexible mirror is substantially planar in the first display state to define a vanity mirror.

18. The convertible mirror assembly of claim 17, wherein the flexible mirror is convex as defined by a spherical shaped portion that curves outwardly from the housing in the second display state.

\* \* \* \* \*